United States Patent [19]

Skala

[11] 4,117,518
[45] Sep. 26, 1978

[54] INK DROP FACSIMILE SYSTEM

[76] Inventor: Stephen F. Skala, 3839 S. Wenonah, Berwyn, Ill. 60402

[21] Appl. No.: 740,805

[22] Filed: Nov. 11, 1976

Related U.S. Application Data

[63] Continuation-in-part of Ser. No. 608,089, Aug. 27, 1975, abandoned, and Ser. No. 421,425, Dec. 3, 1973, abandoned.

[51] Int. Cl.² .............................................. H04N 1/24
[52] U.S. Cl. ..................................... 358/296; 358/285; 346/154; 346/140 R; 101/122; 358/203
[58] Field of Search ............... 358/296, 285, 286, 293, 358/294, 302, 300, 256, 203; 346/160, 154, 75, 140, 1, 74; 101/122, 426, 1; 197/1 R

[56] References Cited

U.S. PATENT DOCUMENTS

| | | | |
|---|---|---|---|
| 2,941,033 | 6/1960 | Fromm | 358/293 |
| 3,261,284 | 7/1966 | Lynott | 101/114 |
| 3,362,325 | 1/1968 | Foster | 101/122 |
| 3,383,699 | 5/1968 | Lapinski | 346/153 |
| 3,477,368 | 11/1969 | Spaulding | 101/150 |
| 3,480,962 | 11/1969 | Weigl | 346/1 |
| 3,592,963 | 7/1971 | Young | 358/293 |
| 3,599,225 | 8/1971 | Babaoff | 346/153 |
| 3,652,793 | 3/1972 | Farr | 358/293 |
| 3,790,703 | 2/1974 | Carley | 346/1 |
| 3,829,608 | 8/1974 | Pietermaat | 358/300 |
| 3,943,525 | 3/1976 | Skala | 346/140 R |
| 3,971,040 | 7/1976 | Skala | 346/140 R |
| 3,972,053 | 7/1976 | Skala | 346/75 |

*Primary Examiner*—Bernard Konick
*Assistant Examiner*—Alan Faber

[57] ABSTRACT

A facsimile transmitter and a facsimile receiver are combined into a common assembly having a single endless band which is driven at a constant velocity to scan an image of an advancing document and to sweep modulated columns of ink drops which deposit upon an advancing sheet of paper. In a preferred embodiment, the endless band has a plurality of uniformly spaced apertures which correspond to a plurality of elongated photodetectors and it also has a similar plurality of orifices which correspond to a plurality of charging electrodes.

As the moving apertures scan an image of the document across the photodetectors, a signal is generated to control the charging electrodes and the endless band of a remote printer. When the facsimile transmitter and receiver operate as a copier, the signal is connected internally to control the charging electrodes.

5 Claims, 6 Drawing Figures

INK DROP FACSIMILE SYSTEM

BACKGROUND OF THE INVENTION

The present invention is a continuation-in-part of applications Ser. No. 421,425 filed on Dec. 3, 1973 and now abandoned and of Ser. No. 608,089 filed on Aug. 27, 1975 and now abandoned.

This invention relates to graphic communication. In one aspect, it relates more particularly to a combined facsimile transmitter and receiver. In another aspect it relates to a method for generating a sequential signal which controls a plurality of simultaneously operating printing elements.

The present invention is part of an improved facsimile system which provides an economical letter service for homes and businesses and which shares facilities with home printed newspapers. Use is made of conventional two-way broadband networks and of previously disclosed ink drop printers. A facsimile system generally comprises a transmitter which converts a graphic image into a signal, a communications channel which conducts the signal to a remote receiver, and a receiver which includes a signal responsive printer to convert the signal back to a graphic image. A summary of conventional facsimile systems may be found in "A Facsimile Survey" (1972) published by the Technical Association of the Pulp and Paper Industry. Typical applications of such conventional facsimile systems are transmissions of weather maps, of photographs to newspapers, and of occasional letters or drawings among businesses. More general use is constrained by high cost which results from a telephone network of narrow bandwidth and from printers which are based upon a complex process or which require expensive recording surfaces.

The receiver portion of the present facsimile system is based upon ink drop printing to selectively deposit drops of liquid ink upon ordinary paper. An ink drop printing method having desirable characteristics of high frequency response, precise ink drop trajectories, and moderate ink pressure and signal responsive ink jet charging voltage is disclosed by R. G. Sweet in U.S. Pat. No. 3,596,275 wherein a periodically disturbed ink jet is electrostatically charged in response to a signal as ink drops are forming. The ink drops project through a constant electrostatic field which deflects charged ink drops into an ink catcher for recycling. Uncharged ink drops deposit on paper to form dots. In the Sweep printing method, however, ink drops can be deflected in only one direction and sweep in a horizontal direction must be provided by motion of the paper or printing head. In facsimile applications, such horizontal sweep conventionally is provided by paper rotating on a cylinder while the paper advances axially. An improved method of horizontal ink drop sweep is disclosed by the present applicant in copending application Ser. No. 605,993 now U.S. Pat. No. 3,971,040 wherein an endless orifice band provides a constant linear motion for the ink drops while paper advances more slowly into a plane surface. A further improvement of this endless orifice band method of horizontal sweep is disclosed by the present applicant in copending application Ser. No. 605,992 now U.S. Pat. No. 3,972,053 which allows a plurality of ink jets to operate simultaneously and increase printing speed proportionally. These orifice band methods are particularly suitable for printing newspapers in homes with selected pages printed on both sides of ordinary paper. Signals for controlling printing of newspapers are preferably transmitted through community antenna cables and share such broadband cable capacity with television antenna signals. Development of home newspaper printing provides facilities and standards for facsimile letter services. A combined system in the home comprises the ink drop orifice band printer which prints newspapers on both sides and letters on one side and cuts letters to a smaller size, a two-way broadband network, and a facsimile transmitter of a kind to be described.

A facsimile system for business use, which is the principal object of this invention, is compatible with the described facsimile system for home use just described but is more specifically limited to letter processing functions which include copying as well as facsimile. Portions of the present facsimile system for business use are known and include the method of printing by means of an orifice band just cited. Another portion is included in a facsimile transmitter disclosed by J. E. Young in U.S. Pat. No. 3,592,963 wherein an endless aperture band scans across a document. Direct and backscattered light is collimated and light admitted to a photodetector is converted into a proportional voltage level. It would be economical to combine the orifice and aperture bands so that commonly used components would be shared, but such combined use has not been disclosed previously. Yet other known portions of the present facsimile system are means for modulating a carrier to generate signals for transmission through a communications channel and means for detecting such signals by a facsimile receiver. Graphic information conventionally represented by such signals controls a single printing element and is derived from successive scans of a single aperture across a document. Such graphic information, however, will not control the plurality of simultaneously operating ink jets of the present facsimile system. It is desireable to transmit signals as a single modulated carrier, but appropriate time division multiplexing methods for controlling a plurality of simultaneously operating printing elements have not been disclosed previously.

OBJECTS OF THE INVENTION

It is a general object to provide an improved facsimile transmitter, receiver, and copier.

It is another object to economically combine facsimile transmitter and receiver functions into a single unit having a commonly shared endless band and other components.

It is yet another object to provide rapid signal responsive ink drop printing from a plurality of openings in the commonly shared endless band.

It is still another object to provide a method for generating a sequential signal to control signal responsive printers having a plurality of simultaneously operating printing elements.

SUMMARY OF THE INVENTION

These and other objects and advantages are accomplished in accordance with the present invention wherein a facsimile receiver and transmitter are combined into a single unit to use in common an endless band which provides a constant linear motion for modulated columns of ink drops which deposit on an advancing sheet of paper to form a graphic pattern in response to graphic signals from remote transmitters and which also provides a constant linear motion for scanning an image of a document which is projected on photodetectors to generate a signal for controlling a remote receiver. Additionally, the generated signal can be used within the combined facsimile transmitter and receiver to provide a copier function.

A further improvement is provied by a plurality of uniformly spaced openings in the endless band which allows a plurality of ink jets to operate simultaneously increasing printing speed proportionally and also allows a plurality of elemental areas of a document to be scanned simultaneously as part of a process which generates a signal for controlling such printers.

The signal, which represents levels of light sampled from a plurality of elemental areas, has characteristics which provide convenient transmission and control. In order to be transmitted at a single carrier frequency, graphic information from each of the plurality of elemental areas is time division multiplexed as a first signal component. Since preferred types of ink drop printer operate at only two-levels with an ink drop either depositing or not depositing on paper, the first signal component is binary. A second signal component indicates that the plurality of elemental areas located at uniform intervals has been scanned, that a sequence of pulses corresponding to these elemental areas is complete, and that another scanning cycle of adjacent elemental areas will begin. This second signal component which provides synchronizing information is preferably distinguished from the first signal component by a greater pulse width. A third signal component indicates that scanning of elemental areas along the interval of uniformly spaced endless band openings is complete and that the openings are at a reference position. This third signal component which provides reset information is preferably distinguished from the two others by yet a greater pulse width.

DESCRIPTION OF THE VIEWS OF THE DRAWINGS

FIG. 1A and 1B, is a highly diagrammatic representation of a combined facsimile transmitter, receiver, and copier using a common flexible endless band to provide a traversing and scanning function, and showing assemblies for transmitting and receiving graphic signals and for synchronizing the endless band.

Referring to the drawings, FIG. 1 shows basic features of a combined facsimile receiver and transmitter based on a shared endless band. The endless band is constrained to a racetrack configuration which has one linear portion for sweeping modulated columns of ink drops and another linear portion for dissecting an image. A plurality of uniformly spaced openings in the endless band has the same distance between their centers as that of photodetectors and charging electrodes. Further, the openings are positioned similarly in the scanning and printing portions so that synchronism is intrinsic during operation as a copier.

Figure 1:
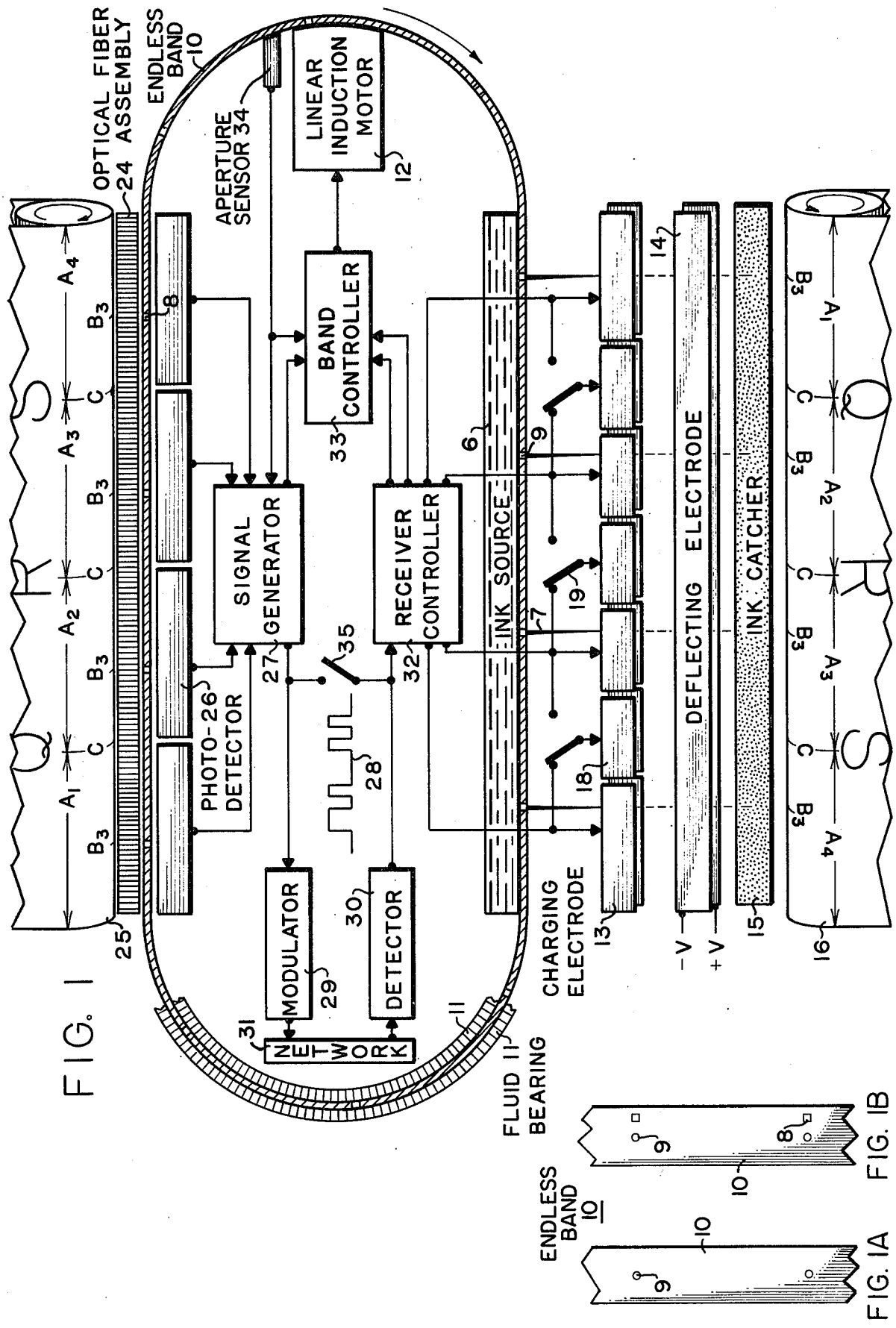
FIG. 1, including

The printer and endless band portions of the present facsimile system are described in more detail in the previously cited U.S. Pat. Nos. 3,971,040 and 3,972,053. Briefly, ink from an ink source 6 emerges under pressure as ink jets 7 from uniformly spaced orifices 9 in a flexible endless band 10. The endless band is constrained by fluid bearings 11, only partly shown, and advanced by the stator portion of a linear induction motor 12 which includes the endless band as an armature. When the orifices are positioned on the ink source as shown, the ink jets form drops between charging electrodes 13 which, in response to signals, are either at a high or at a zero voltage level. When the charging electrodes are at a high voltage level, the forming ink drops become electrically charged, are deflected in the electrostatic field of deflecting electrode 14 to deposit on ink catcher 15 from which they are recycled to the ink source. When the charging electrodes are at zero voltage, the ink drops are uncharged and project undeflected to deposit on paper 16. As the endless band advances, the ink jets approach transfer charging electrodes 18 which connect to the voltage level of adjacent charging electrodes 13 by means of transfer switches 19. The transfer switches synchronize with the position of the endless band so that charge induced on the ink jets is not a function of position. The basic purpose of an endless band in the printer portion of the combined facsimile receiver and transmitter is to provide a linear motion at a constant speed for modulated columns of ink drops. Alternative methods for modulating columns of ink drops for deposit on paper are described in the cited U.S. Pat. Nos. 3,971,040 and 3,972,053.

The transmitter portion of the present combined facsimile receiver and transmitter uses openings in the endless band to dissect an image of a document as the endless band scans across a line of photodetectors. In the preferred embodiment of FIG. 1, an optical fiber assembly 24 transmits light reflected from an illuminated document 25 through apertures 8 in the endless band through which light passes to photodectors 26. Alternative openings in the endless band are shown in FIGS. 1A and 1B. In FIG. 1A, openings 9 function both as orifices for ink jets and as apertures for light transmission. In FIG. 1B, openings 9 function only as orifices and openings 8 function only as apertures. The photodetectors are elongated structures which convert light energy to a corresponding electrical amplitude such as voltage. A suitable silicon photovoltaic photodetector is described in the cited Young patent. Voltage levels of the photodetectors enter signal generator 27 where they are converted to a sequential signal illustrated by 28. The sequential signal modulates a carrier in modulator 29 for transmission through network 31 to a detector 30 of a remote facsimile receiver. A receiver controller 32 separates the signal into synchronizing information and graphic information, converts the graphic information into one of the two voltage levels of the charging electrodes, and transmits synchronizing information to band controller 33 which drives the linear induction motor so that endless band speed and position are synchronous with the graphic information. An alternative method for coupling graphic information from the signal generator to the receiver controller is by a by-pass connection shown by switch 35 which is used during operation as a copier. The signal generator 27, receiver controller 32, band controller 33, linear induction motor 12, and aperture sensor 34 are described in more detail with reference to FIG. 3.

Modulator 29, detector 30, and network 31 function together to provide a connecting channel for signal 28 between a facsimile transmitter and receiver. Signal 28 is a binary pulse code modulated signal since the ink drop printing controlled by it is a two level process. In a coaxial cable network, the modulator includes an RF oscillator which is gated in response to signal 28 to generate a sequence of RF pulses which are coupled to the coaxial cable. A detector is tuned to the RF carrier frequency and converts the RF signal back to signal 28. Various types of pulse code modulation, networks, and circuits for modulating and detecting are well known and can be used in the practice of this invention.

Document 25 and paper 16 show letter designations $A_i$, $B_j$, and C which correspond to structures of the facsimile transmitter and receiver and to components of signal 28. Briefly, $A_i$ corresponds to graphic information from a photodetector designated by the subscript and provides a first signal component, $B_3$ is the instant position shown for apertures 8 and orifices 9 and is a second signal component which provides synchronizing information, and C is a reference location to which the endless band is reset in synchronism with the third signal component. Aperture sensor 34 is positioned to be centered on one aperture when other apertures are centered on location C between the photodetectors. The signal and its relation to facsimile transmitter and receiver components is described in more detail with reference to FIGS. 2 and 3.

Figure 2:
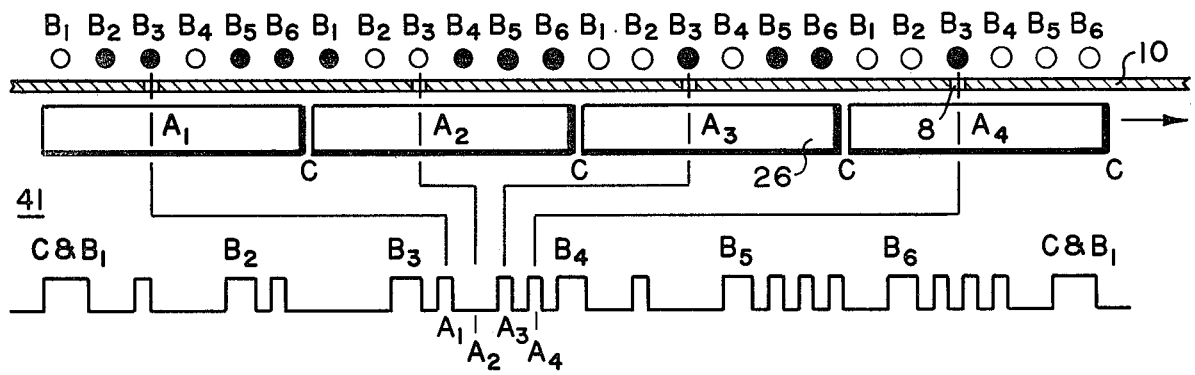
FIG. 2 is a highly diagrammatic representation of a scanned line of elemental areas which are detected at uniform intervals and are shown converted into a corresponding sequential signal.

FIG. 2 shows in more detail relations between a multiplexed sequential signal 41 for controlling a plurality of uniformly spaced traversing printing elements, a corresponding plurality of photodetectors 26 and scanning apertures 8, and and image line represented by a row 40 of dots. If each photodetector were connected to a corresponding charging electrode through a separate channel, a signal generated as an aperture scanned across a photodetector would represent the image line with a normal order of elemental areas. For control of remote printers, however, it is desirable to combine signals originating in all photodetectors along with synchronizing signals into a single channel. Accordingly, a time division multiplexing method is used wherein a signal from each photodetector is sampled cyclically to generate a sequence of first signal components, $A_i$, a synchronizing second signal component, $B_j$, is generated to indicate beginning of such a sampling cycle, and a synchronizing third signal component, C, is generated to indicate that apertures are positioned between the photodetectors to provide reset information. These three signal components are related to the dots, apertures 8 in endless band 10 and to the photodetectors labled $A_1$ to $A_4$. The dots are labeled cyclically from $B_1$ to $B_6$ and the interval between centers of like labeled dots, apertures, and photodetectors is the same. Accordingly, the apertures sample dots having the same subscript and each photodetector is exposed through one of the apertures. In the drawing, signal 41 is obtained by scanning the dots. When the apertures are aligned with dots $B_3$ as shown, sampling through the photodetectors sequentially results in a pulse corresponding to a black dot at $A_1$, an absence of a pulse corresponding to a white dot at $A_2$, and two pulses corresponding to black dots at $A_3$ and $A_4$: as indicated by the lines between the pulses and the dots labeled $B_3$. As the apertures advance to be aligned with dots $B_4$, a second signal component designated $B_4$ is generated and sequential sampling results in one pulse corresponding to a black dot at $A_2$. After the apertures have scanned dots $B_1$ to $B_6$, a convenient reset point occurs between photodetectors and a third signal component labeled C & $B_1$ is generated. The following example is more representative. With aperture intervals of 0.25 inch, a resolution of 140 elemental areas per inch, and an $11\frac{1}{2}$ inch wide page, the range of the $A_i$ and $B_j$ signal components is $A_1$ to $A_{46}$ and $B_1$ to $B_{35}$.

Figure 3:
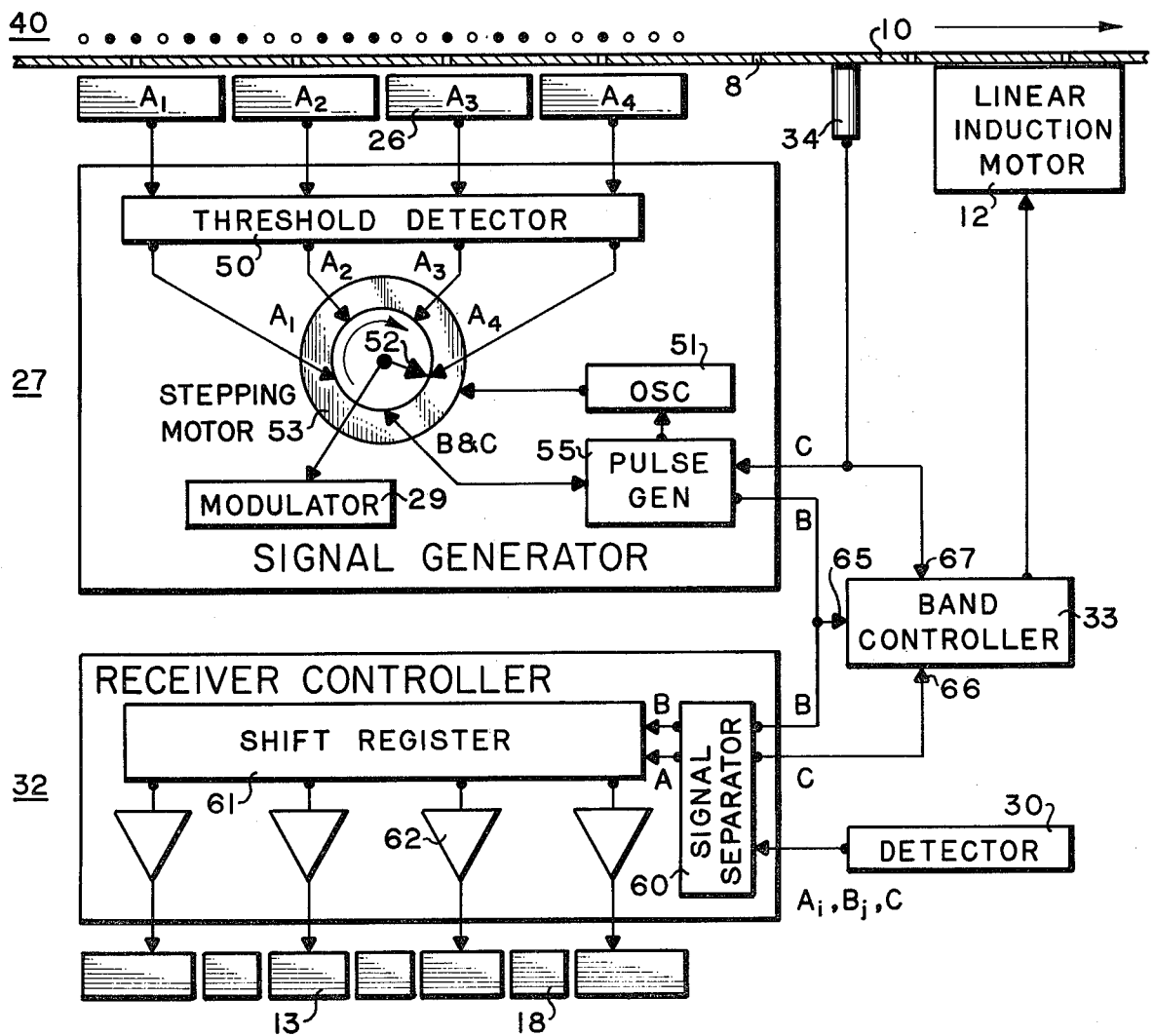
FIG. 3 is a highly diagrammatic representation of the transmitter and receiver signal processing apparatus showing a means for generating the sequential signal and for using the sequential signal to control a printer.

FIG. 3 shows in more detail portions of the facsimile transmitter and receiver described with reference to FIG. 1 which generate and are controlled by the signal described with reference to FIG. 2. A line along a document being scanned by apertures 8 in endless band 10 is represented by a row of dots 40. Light projected on photodetectors 26 is converted to a corresponding voltage which is connected to threshold detector 50. The threshold detector converts photodetector analogue voltage levels above or below a threshold reference voltage level into corresponding two-level voltage outputs with black corresponding to logic ONE and white to logic ZERO. The threshold detector comprises known comparator or trigger circuits. The two-level voltages at each output of the threshold detector are sampled by a commutator which forms a sequence of pulses from the logic ONE voltage levels and adds a synchronizing pulse when a sequence of sampled pulses is complete. The threshold detector outputs connect to contacts labeled $A_i$ of rotary switch 52. An oscillator and stepping motor controller 51 advances stepping motor 53 so that the rotary switch dwells on a contact for one interval and then advances to dwell between contacts for another interval to generate a sequence of pulses having a uniform pulse width. When the rotary switch is positioned on the contact labeled B & C, pulse generator 55 senses the switch position and inhibits the controller portion of 51 so that the dwell interval on the contact is extended for one pulse period to form a second signal component. If at the same time, aperture sensor 34 senses a passing aperture 8, the dwell interval is extended for an additional pulse period to form a third signal component. The output of the rotary switch to modulator 29 is the sequential signal shown in FIG. 2 with the $A_i$, $B_j$, and C signal component pulse widths in the ratio 1 : 2 : 3 respectively. Circuit means for sensing switch position by an impedance change, for generating an inhibiting pulse on such impedance change by such means as a one-shot multivibrator, and for inhibiting a stepping motor advancing pulse by a negative inhibiting pulse on an otherwise positive input of an AND gate are well known. The rotary switch, stepping motor, and oscillator and stepping motor controller are components of a representative commutator which illustrates the process of generating a sequential signal for controlling a plurality of simultaneously operating printing elements. Known electronic commutators comprising transistor switches energized by sequential switch drivers are preferred.

Receiver controller 32 demultiplexes the sequential signal to direct graphic information to corresponding charging electrodes and to transmit synchronizing information to control the endless band. A sequential signal from detector 30 enters signal separator 60 which includes known integrating trigger circuits to sort the $A_i$, $B_j$, and C signal components according to pulse width into separate outputs labeled A, B, and C. A shift register and clock 61 receive and transfer the $A_i$ signal components into the shift register. When a B signal component is received, states of the shift register corresponding to the $A_i$ signal components are transferred in parallel to amplifiers 62 which control charging electrodes such as 13. The shift register is then clear to enter another sequence of $A_i$ signal components.

The endless band is advanced at a constant speed during operation of either the transmitter or receiver portions and is further synchronized with position information during operation of the receiver portion. One endless band function is that of an armature of a linear induction motor wherein a conventional method of speed control, which is preferred for the present invention, is adjustment of synchronous frequency. Such synchronous frequency is derived from the periodic B signal component. When the signal generator portion is operating to transmit a signal, B signal component pulses from pulse generator 55 enter band controller 33 at input 65, are divided to a lower frequency symmetrical waveform, amplified, and connected to the stator of linear induction motor 12 which drives the endless band. When the receiver controller portion is operating to print in response to a signal, B signal component pulses from the signal separator enter the band controller at 65 to drive the endless band as just described. If the C signal component on input 66 of the band controller does not coincide with a pulse on input 67 which corresponds to an aperture 8 passing aperture sensor 34, the band controller switches to an internal oscillator which changes the frequency to the linear induction motor for a corresponding change in endless band speed until the C signal component coincides with a pulse from the aperture sensor. Means to provide the band controller functions just described are based on various known electronic circuits of which the following are examples. Frequency division of the B signal components and generation of symmetrical waveforms are provided by flip-flops. Synchronization of endless band position is provided by transferring the aperture sensor pulse on 65 to a gate output except when inhibited by a C signal pulse on 66, using the transferred pulse on the gate output to trigger a monostable multivibrator which switches outputs for a predetermined time, and using the normally ON output of the multivibrator to switch in the signal controlled oscillator to drive the endless band at a slightly faster speed and using the complementary output of the multivibrator to switch in the internal oscillator for a slower endless band speed.

Figure 4:
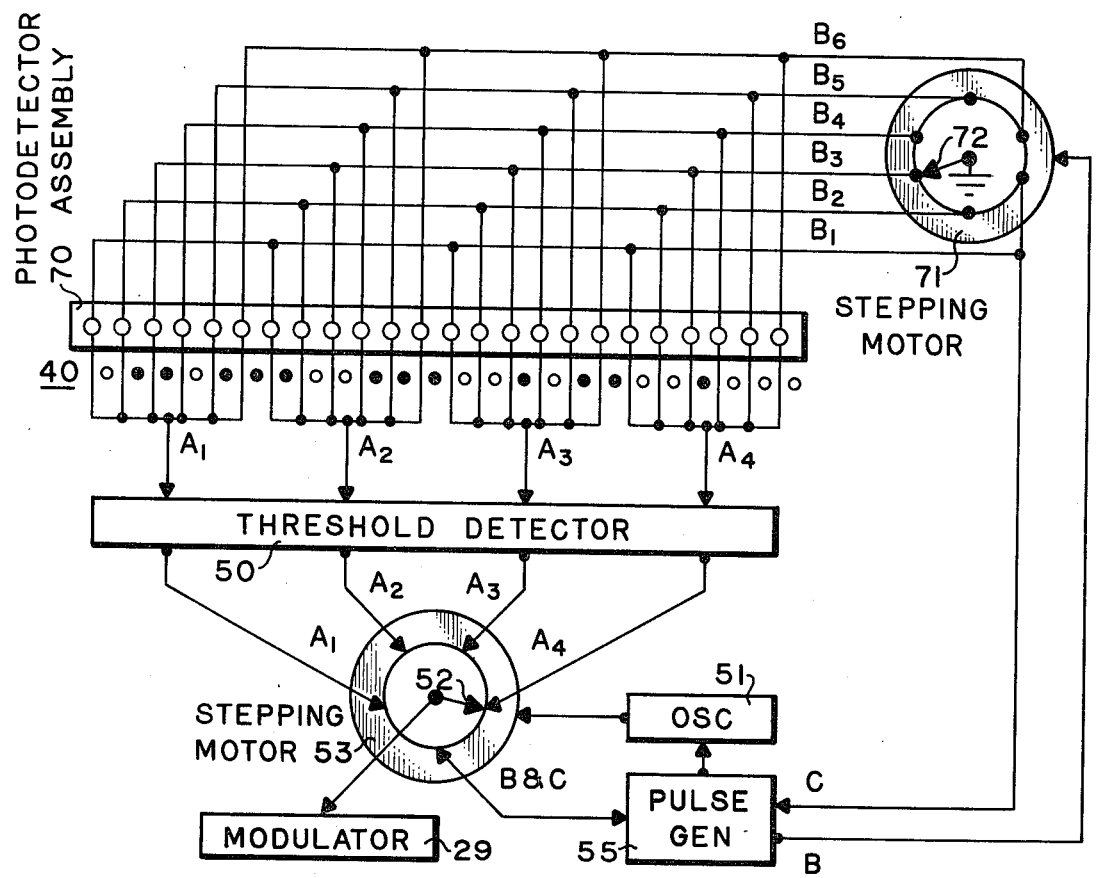
FIG. 4 is a highly diagrammatic representation of an alternative means for generating the sequential signal using a linear array of stationary photodetectors.

FIG. 4 shows an alternative method for generating the signal described with reference to FIG. 2. Photodetectors having the approximate dimensions of an elemental area are energized sequentially at uniform intervals to sample a line of elemental areas in the pattern provided by apertures in an advancing endless band. An ink drop printer having a corresponding linear array and sequential energizing of printing elements is described by the present applicant in now issued U.S. Pat. No. 3,943,525. Accordingly, the sequential signal described herein can be generated by various scanning means and can be used to control alternative printers all characterized by a plurality of simultaneously operating and uniformly spaced elements advancing along a line.

A photodetector assembly 70 comprising a linear array of photodetectors is positioned to receive an image of a graphic pattern represented by a line of dots at 40. The photodetectors are connected on one side in segments $A_i$ which connect to threshold detector 50.

The threshold detector connects to a parallel to serial converter represented by rotary switch 52 which is advanced by stepping motor 53 as described with reference to FIG. 3. The photodetectors are connected to the other side at uniform intervals to lines labeled $B_j$ which connect to contacts of another serial to parallel converter represented by stepping motor 71 and rotary switch 72. When rotary switch 52 advances to contact labeled B & C, pulse generator and controller 55 transmits electrical power to stepping motor 71 which advances rotary switch 72 to the next contact. When rotary switch 72 advances to contact labeled $B_1$, a signal on wire C to pulse generator 55 causes stepping motor 53 to dwell for an extended interval to generate a third signal component. The steps described generate the sequential signal described with reference to FIG. 2 which is connected to modulator 29 for transmission into a broadband network.

What is claimed is:

1. A facsimile receiver and transmitter assembly including
    a signal responsive printer in said assembly for printing a graphic pattern on a receiving surface in response to signals,
    a scanner in said assembly for converting a graphic pattern on a document to signals for controlling printing of another signal responsive printer remote from said assembly,
    an endless band having a plurality of uniformly spaced openings,
    means to move said band through said printer in said assembly and through said scanner,
    means to form modulated ink drop columns from ink passing through at least some of said openings to deposit drops in said columns in a graphic pattern on a receiving surface,
    a plurality of photodetectors corresponding to at least some of the openings in the endless band,
    means to project an image of said document through at least some of said openings to said photodetectors, and
    means to convert output of said photodetectors to a sequential signal for controlling printing of said remote printer.

2. A facsimile receiver and transmitter assembly as in claim 1 wherein all of said openings serve both to form modulated ink drop columns and to project an image on said photodetectors.

3. A facsimile receiver and transmitter assembly as in claim 1 wherein a portion of said openings are orifices for forming modulated ink drop columns, and the remaining portions are apertures for projecting an image on said photodetectors.

4. A facsimile receiver and transmitter assembly including a signal responsive printer in said assembly for selectively depositing drops of liquid ink on a receiving surface to print a graphic pattern,
    a scanner in said assembly for converting an image of a line of elemental areas on a document to a signal for controlling printing of signal responsive printers located in said assembly and remote from said assembly,
    an endless band having at least one opening,
    means to move said endless band through said printer and said scanner in said assembly,
    means to form a modulated ink drop column from ink passing through said opening to deposit said drops on said surface, means to project said image through said opening to an elongated photodetector, and
means for converting output of said photodetector to a signal for controlling said signal responsive printers.

5. A facsimile receiver and transmitter assembly as in claim 4 wherein said signals from said scanner in said assembly
control printing of said signal responsive printer in said assembly to provide a copying function.

* * * * *